Patented May 15, 1956

2,745,854
DEHYDRATED CASTOR OIL FATTY ACIDS

Wesley A. Jordan, Minneapolis, Minn., assignor to General Mills, Inc., a corporation of Delaware No Drawing. Application May 5, 1952,
Serial No. 286,200

4 Claims. (Cl. 260—405.5)

The present invention relates to a process of dehydrating castor oil fatty acids with or without the simultaneous enhancement of the value of semi-drying or non-drying oil acids. The process results in high yields or dehydrated castor acids without the usual polymerization losses encountered in prior art processes.

A variety of processes of dehydrating castor oil and castor oil fatty acids have been known. When castor oil is dehydrated the resultant product is still a triglyceride and its utility is limited accordingly. When castor oil fatty acids are subjected to dehydration and distillation, high pitch losses are encountered as a result of the polymerization of the conjugated acids formed. This is evident from the following considerations. In the usual dehydration process practically all of the castor oil fatty acids are dehydrated. This dehydration process results in the formation of an additional double bond. Modern theories postulate that this additional double bond is formed in the 12-position, which is non-conjugated with respect to the double bond at the 9-position in the original ricinoleic acid. The new double bond does tend to migrate, however, to the 11-position during the long period of heating involved in the dehydration process. This migration, however, proceeds slowly and as a result only part of the dehydrated acids are converted to conjugated acids during the dehydration process. Moreover, polymerization of some of the conjugated acids also occurs during the dehydration process and further polymerization occurs during the distillation step. Accordingly, the distillate which is obtained contains only a relatively small proportion of conjugated acids and a majority of non-conjugated dehydrated castor oil acids. It is extremely difficult, therefore, to produce dehydrated castor oil fatty acids in a distilled condition which contain more than about 25% conjugated fatty acids. In addition, pitch losses reduce the yield of dehydrated acids to from 75–80% of the original acids.

The present process involves the discovery that castor oil fatty acids may be dehydrated in the presence of unconjugated fatty acids from an external source, and that this dehydrated mixture may be subjected to distillation to yield most of the conjugated material in the distillate without any appreciable pitch loss during the distillation step.

It is therefore an object of the present invention to provide a process of dehydrating castor oil fatty acids in the presence of non-conjugated fatty acids added from an external source, and the subsequent distillation of the dehydrated mixture to yield a high yield of conjugated castor oil fatty acids with a low pitch loss.

The present process involves the admixture of an unsaturated higher fatty acid with ricinoleic acid, and the heating of these acids together to esterify the hydroxyl group on ricinoleic acid with the higher fatty acid to yield an ester generally referred to as an estolide. This esterification reaction results in the liberation of water which is vaporized and removed from the reaction mixture. The estolide is then subjected to a high temperature treatment which "cracks" the estolide to yield the original unsaturated higher fatty acid and the dehydrated castor fatty acid. This cracking operation may be conducted at distillation temperatures in conjunction with distillation, the products being distilled and collected as distilled products.

The process may be conducted such that the added fatty acids are subsequently removed in the distillation step but preferably is conducted so that the added fatty acids are allowed to remain in the product. In this latter event, the process amounts to an up-grading of the poorer drying fatty acids employed. The advantages thereof are apparent from the following.

In use dehydrated castor acids are usually not employed by themselves but are admixed with non-conjugated fatty acids. For example, in the production of alkyds, dehydrated castor acids may be mixed with cottonseed fatty acids, which are substantially free from linolenic acid, and this mixture of acids is used for the production of high quality non-yellowing alkyds. Accordingly the presence of the added non-conjugated fatty acids in the product of the present invention is no disadvantage, but on the contrary, results in the type of product customarily used by the trade. Another advantage of the present invention is evident from the fact that by starting out with a mixture of equal weights of castor acids and other fatty acids, it is possible to end up with a distilled mixture of acids with about 20–25% conjugated acids, approximately the concentration of conjugated acids in distilled dehydrated castor acids as made by present processes, and without any significant pitch loss.

Any isolated fatty acid from a fat or oil, as well as any selected group of fatty acids of a fat or oil or even the whole mixed fatty acids of a fat or oil may be employed for the present invention, depending upon the characteristics of the product ultimately to be produced. Generally acids containing from 8 to 18 carbon atoms are useful for this purpose.

Where the added fatty acids are to be removed from the product, it is preferred to employ the shorter chain higher fatty acids, such as the $C_8$ to $C_{14}$ fatty acids. In this manner it is possible to produce a pure distilled dehydrated castor acid product without significant pitch loss. In such a process the estolides are formed in the same manner, and the estolide is likewise cracked in the same manner. The mixture thus obtained is then subjected to fractional distillation, and it is readily possible to fractionate out the low boiling $C_8$ to $C_{14}$ acids, and to separate them from the dehydrated castor fatty acids. In this way it is possible to obtain a relatively pure dehydrated castor fatty acid without entailing the high pitch losses encountered in the prior art methods. The presence of the short chain $C_8$ to $C_{14}$ acids during the distillation and fractionation serves to reduce polymerization losses in the same manner as does the presence of the longer chain fatty acids which was described previously.

Example 1

A mixture of 244 g. of castor fatty acid and 244 g. of the unsaturated fraction of cottonseed oil fatty acids was heated in a round bottom flask to 250° C. Water was evolved during the heating and 7 g. of water was collected. The mixture was cooled to 170° C. and was slowly charged into a laboratory still. During the addition of the first 100 g. the pot temperature was held at 220° C. The total pressure on the system was 1 mm. During the addition of the next 300 g., the pot was held at 280° C. and the same vacuum was maintained. The pot temperature was finally raised to 300° C. at the same pressure, and the balance of the material was charged into the still. The distilled product had the following characteristics and was obtained in the following amounts:

Theoretical yield _____ 478 g.
Yield of distillate _____ 426.0 g.—89%
Yield of residue _____ 52.0 g.—10%

Analysis of distillate:

Iodine No _____ 140.5
Acid No _____ 187.0
Per cent unsap _____ 0.9
Hydroxyl No _____ 0.0
Per cent conjugation _____ 22.1

An alkyd resin was prepared from the above product and was found to be superior in all properties to a corresponding alkyd made from fractionally distilled cottonseed fatty acid.

*Example 2*

A mixture of 125 g. of castor acids and 375 g. of the unsaturated fraction of cottonseed oil fatty acids was heated to 180° C. The water liberated during the reaction was removed. The mixture was then slowly charged into a laboratory still which was maintained at 1 mm. pressure. During the addition of the first half of the mixture the pot temperature was maintained at 250° C. Gradually during further addition of distilland the pot temperature was raised to 300° C. The product was obtained in the following quantities and had the following characteristics:

Theoretical yield _____ 495 g.
Yield of Distillate _____ 461 g.—93%

Analysis:

Iodine No _____ 128
Acid No _____ 193
Hydroxyl No _____ 7.4
Unsap. percent _____ .57
Percent conjugation _____ 7.5

While specific conditions have been given in the examples, these conditions may be varied in accordance with known methods. Insofar as estolide formation is concerned, this starts at about 150° C. and temperatures of from 150–250 and preferably about 225° C. may be employed. For cracking the estolide, temperatures as low as 250° C. may be used with an optimum temperature of about 275° C. In order to complete the reaction, it is usually desirable to raise the temperature to 300° C. toward the end of the reaction.

The extent of estolide formation may be followed by following the acid value. As estolide is formed, the acid value decreases to a minimum. Beyond this point some of the estolide formed may begin to crack at relatively low temperatures and liberate free acid groups. The acid number therefore begins to rise.

The degree of cracking may likewise be followed by following the acid number. As cracking proceeds, the acid number increases, and near completion of the reaction approaches the acid number of the original starting material.

I claim as my invention:

1. Process of dehydrating castor fatty acids which comprises heating a mixture of castor fatty acids and an added higher fatty acid to an elevated temperature within the approximate range of 150–250° C. to form the estolide of the castor fatty acids, and then subjecting the estolide to an elevated temperature within the approximate range of 250–300° C. to yield a mixture of dehydrated castor fatty acids and the added higher fatty acid, vaporizing the mixture and condensing the dehydrated castor fatty acid and the additional fatty acid.

2. Process according to claim 1 in which the additional fatty acid is an unsaturated higher fatty acid.

3. Process according to claim 1 in which the additional fatty acid is the unsaturated fatty acid fraction of cottonseed oil.

4. Process of dehydrating castor fatty acids which comprises heating a mixture of castor fatty acids and an added higher fatty acid containing from 8 to 14 carbon atoms, to an elevated temperature within the approximate range of 150–250° C. to form the estolide of the castor fatty acids, subjecting the estolide to an elevated temperature within the approximate range of 250–300° C. to yield dehydrated castor fatty acids and the added higher fatty acid fractionally distilling the resultant mixture of fatty acids to yield the dehydrated castor fatty acids and the fatty acids having from 8 to 14 carbon atoms as separate fractions.

References Cited in the file of this patent
UNITED STATES PATENTS 2,308,222     Walton et al. _____ Jan. 12, 1943
2,336,186     Nessler _____ Dec. 7, 1943